US006977894B1

(12) United States Patent
Achilles et al.

(10) Patent No.: US 6,977,894 B1
(45) Date of Patent: *Dec. 20, 2005

(54) METHOD AND APPARATUS FOR DISCARDING DATA PACKETS THROUGH THE USE OF DESCRIPTORS

(75) Inventors: Heather Achilles, Hudson, NH (US); Terry Pearson, Hollis, NH (US); Paul Gallo, Newton, MA (US); Larry Manor, Londonderry, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/314,566

(22) Filed: May 19, 1999

Related U.S. Application Data

(60) Provisional application No. 60/086,078, filed on May 20, 1998.

(51) Int. Cl.[7] .............................................. H04L 12/26
(52) U.S. Cl. ...................... 370/235; 370/412; 709/232
(58) Field of Search ................................ 370/229–238, 370/412

(56) References Cited

U.S. PATENT DOCUMENTS

| | | | |
|---|---|---|---|
| 6,104,700 A * | 8/2000 | Haddock et al. | 370/235 |
| 6,188,698 B1 * | 2/2001 | Galand et al. | 370/412 |
| 6,459,682 B1 * | 10/2002 | Ellesson et al. | 370/235 |
| 6,628,609 B2 * | 9/2003 | Chapman et al. | 370/229 |
| 6,647,424 B1 * | 11/2003 | Pearson et al. | 709/232 |
| 6,650,644 B1 * | 11/2003 | Colley et al. | 370/395.21 |

OTHER PUBLICATIONS

Nichols et al., "A Two-bit Differentiated Services Architecture for the Internet", Dec. 1997, pp. 1-19.*

Gbaguidi et al., "A Survey of Differentiated Services Proposals for the Internet". SSC Technical Report SSC/1998/020, May 1998, pp. 1-4.*

Baumgartner et al., "Differentiated Services: A New Approach for Quality of Service in the Internet". University of Beme, Institu of Computer Science and Applied Mathematics, 1996, pp. 1-19.*

* cited by examiner

*Primary Examiner*—Seema S. Rao
*Assistant Examiner*—Michael J. Moore
(74) *Attorney, Agent, or Firm*—Blakely Sokoloff Taylor & Zafman, LLP

(57) ABSTRACT

A method, apparatus and article of manufacture for discarding a data packet. The data packet is classified according to a type of service (TOS) indicator and modified with an internal service class (ISC) indicator according to the TOS indicator. The data packet is modified with a watermark (WM) indicator according to the availability of a system resource. The ISC, WM and a drop preference (DP) indicator of the data packet are compared to a committed information rate (CIR). The packet is discarded if the DP exceeds the CIR.

6 Claims, 4 Drawing Sheets

METHOD AND APPARATUS FOR DISCARDING DATA PACKETS THROUGH THE USE OF DESCRIPTORS

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for discarding data packets through the use of descriptors.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation. Although it sounds trivial, the notion of stable operation has been elusive in the ISP community, as witnessed by various Internet "brown-outs" since it's inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queuing algorithms, and sophisticated discard techniques must be provided.

B. Service Differentiation. Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability. ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Therefore, there is a need for a way to route data in computer networks that provides stable operation, service differentiation, and superior reliability. Such an invention should be stable under adverse conditions, insure low packet loss to stable destinations, and provide reasonable fairness and congestion control.

SUMMARY OF THE INVENTION

The present invention provides a method, apparatus and article of manufacture for discarding a data packet. The data packet is classified according to a type of service (TOS) indicator and modified with an internal service class (ISC) indicator according to the TOS indicator. The data packet is modified with a watermark (WM) indicator according to the availability of a system resource. The ISC, WM and a drop preference (DP) indicator of the data packet are compared to a committed information rate (CIR). The packet is discarded if the DP exceeds the CIR.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE INVENTION

In the following description of an embodiment, reference is made to the accompanying drawings which form a part hereof, and in which is shown by way of illustration a specific embodiment in which the disclosed technology may be practiced. It is to be understood that other embodiments may be utilized and structural changes may be made without departing from the scope of the disclosed technology. An embodiment of the disclosed technology, described below, enables a remote computer system user to execute a software application on a network file server.

The disclosed technology provides a method, apparatus and article of manufacture for discarding a data packet. The data packet is classified according to a type of service (TOS) indicator and modified with an internal service class (ISC) indicator according to the TOS indicator. The data packet is modified with a watermark (WM) indicator according to the availability of a system resource. The ISC, WM and a drop preference (DP) indicator of the data packet are compared to a committed information rate (CIR). The packet is discarded if the DP exceeds the CIR.

Hardware Environment

Figure 1:
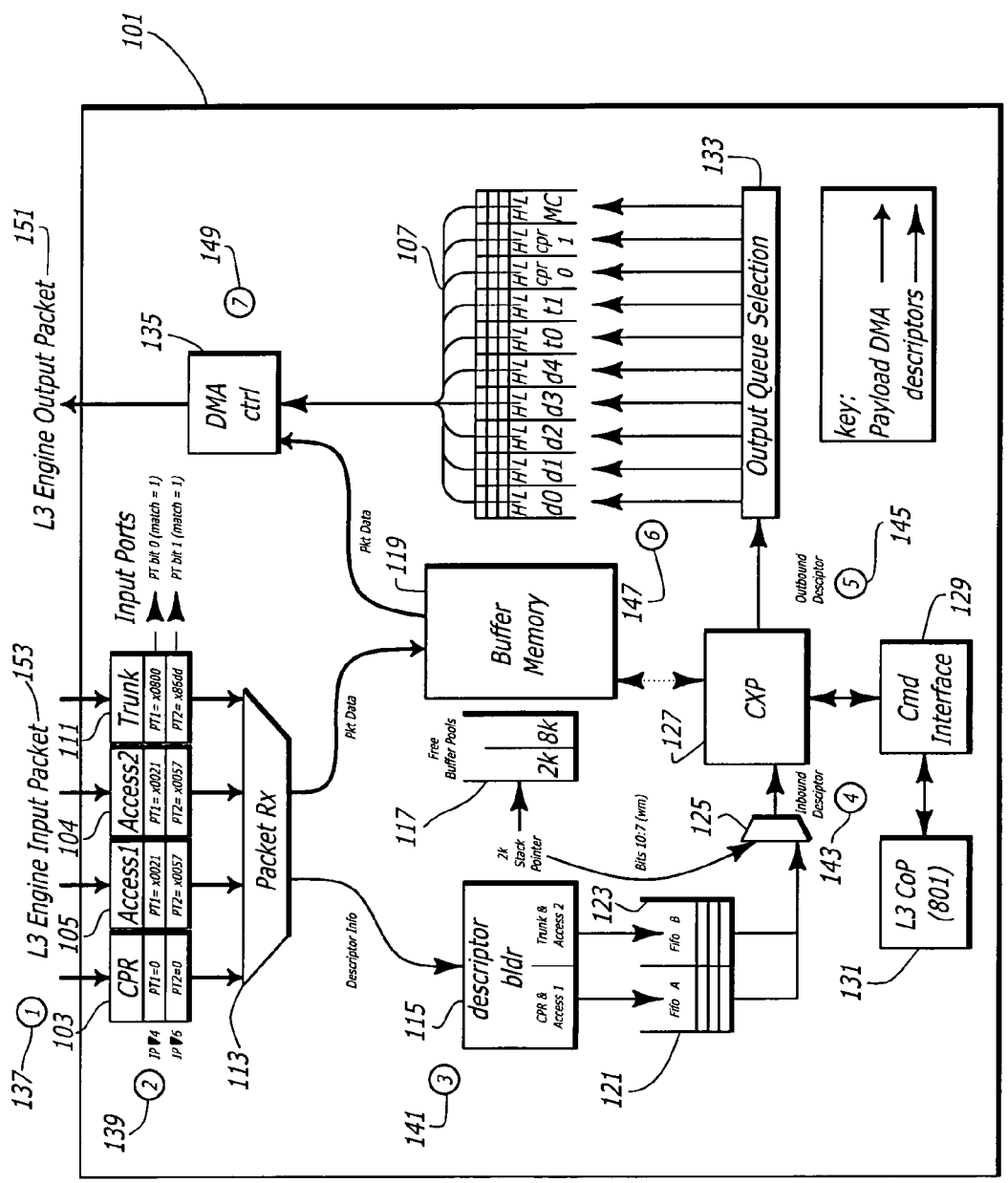
FIG. 1 shows a block diagram of an L3 card forwarding path compatible with the present invention.

FIG. 1 illustrates a data path of a packet through a hardware environment compatible with the disclosed technology. At step 137, packets 153 enter the L3 card 101 from the access cards 105, 109, trunk card 111, and central process and resource (CPR) 103 cards. At step 139, inbound descriptor information is obtained from the received packet 113 as it is transferred into buffer memory 119 having a free buffer pool 117. The packet type field is compared with PT1 and PT2 type registers, with the PT bits set according. At step 141, an inbound descriptor 115 is built by combining the CPR 103 and trunk card 111 information. In one embodiment, a channel identifier, control information, and a data packet length is passed directly to the inbound descriptor 115. The CPR 103 descriptor information is forwarded to a FIFO A memory 121 and the trunk card 111 information is forwarded to a FIFO B memory 123. At step 143, the inbound descriptor 125 is read by a route switch processor (CXP) 127 and processed with the help of a command interface 129 and a L3 coprocessor 131. At step 145, an outbound descriptor is written by the CXP 127 to an output queue selector 133. At step 147, the descriptor is directed to the appropriate outbound queue 107. At step 149, the outbound descriptor is used to direct packet re-generation from a DMA controller 135 to a destination 151, and free a buffer in buffer memory 119 back to the free buffer pool 117.

To summarize, the CXP 127 reads an inbound descriptor 125, determines the packet's destination via IP Protocol destination address lookup, builds the packet outbound descriptor for packet transmission, and writes the outbound descriptor to the appropriate channel outbound queue 107 for transmission from a DMA controller 135 to a destination 151.

Buffer Memory

Figure 2:
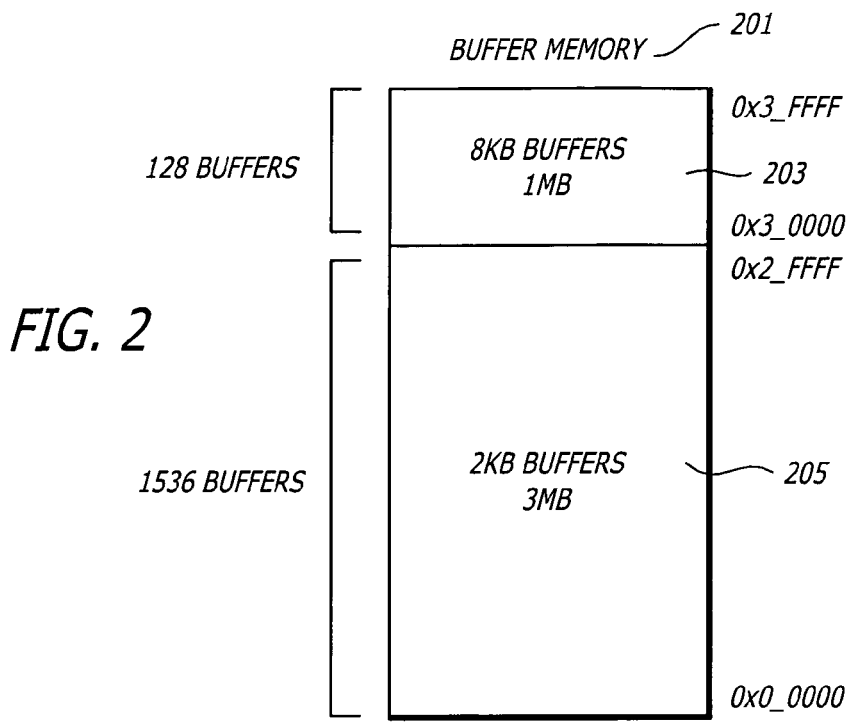
FIG. 2 shows a buffer pool division compatible with the present invention.

Incoming packets 153 are transferred directly from the access cards 105, 109, trunk card 111, and CPR 103 cards into the L3P buffer memory 119. An example structure of a typical 4 MB buffer memory 119, 201 is shown in FIG. 2, where one MB of memory is divided in to 8 KB buffers 203, and 3 MB of memory is divided into 2 KB buffers 205. A data packet is allocated to a buffer from the 2 K or 8 K buffer pool as indicated by the length received in the first word of the data packet. Any packet longer than 1536 bytes will be allocated an 8 K byte buffer. If the system is unable to allocate a buffer from the appropriate free buffer pool, the incoming packet is dropped indiscriminately prior to any attempt for proper quality of service (QOS) classification. Therefore, in order to ensure proper QOS operation, packet discard at this point should be avoided.

The 4 MB buffer memory 119, 201, is preferably divided into one or two pools of fixed size buffers, as described above. Two supported sizes are 2 KBytes and 8 Kbytes, but it will be recognized by one of ordinary skill in the art that other buffer sizes may be used without loss of generality. The division between these two pools is under software control. For example, the entire 4 MB can be allocated to all 2 KB buffers and vice versa, or different portions can be allocated to each pool.

The pointers to the buffers in the 2 KB pool and 8 KB pool are maintained in two separate stack memories. Each stack memory can hold up to 8K-1 (or 8191) buffer pointers and typically has a 13-bit stack pointer. The stack pointer always points to the top of the stack. When the Stack Pointer points to the location 0, it indicates that the buffer pool is empty. The content of the stack pointer always represents the number of available buffers in that pool.

To put a buffer pointer on the stack, the stack pointer is advanced by one and then a new buffer pointer is written. To pop a buffer pointer from the stack, the buffer pointer on top of the stack is read and then the stack pointer is subtracted by one.

Watermark Generation

In one embodiment of the disclosed technology, bits 9, 8, and 7 of the 2 KB Stack Pointer are used as watermark indicator. These bits provide eight priority buckets as shown in Table 1 below.

TABLE 1

Buffer Pool Watermark.

| Watermark | Number of Buffers |
| --- | --- |
| 000 | 0 to 127 |
| 001 | 128 to 255 |
| 010 | 256 to 383 |
| 011 | 384 to 511 |
| 100 | 512 to 639 |
| 101 | 640 to 767 |
| 110 | 768 to 895 |
| 111 | >895 |

To ensure accurate and timely buffer pool level indication, the watermark bits, at the time of the CXP 127 inbound descriptor 125 is read are fed into the inbound descriptor 125. The CXP 127 uses these bits to drop packets by freeing up buffers during periods of congestion.

Figure 3:
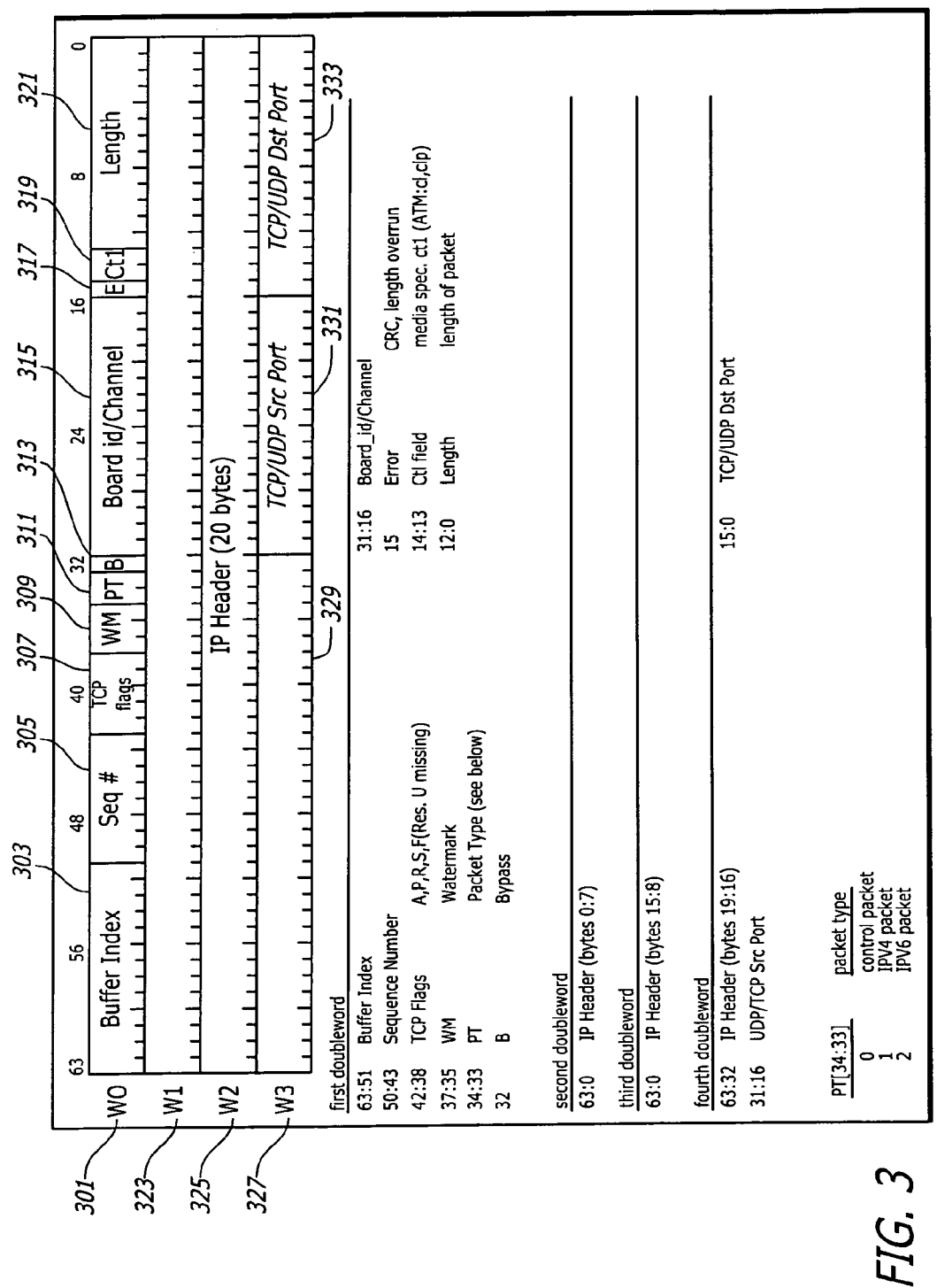
FIG. 3 shows an inbound descriptor format compatible with the present invention.

In FIG. 3, an embodiment of the first four words of an inbound descriptor is shown. Word 301 contains a buffer index 303, a sequence number 305, TCP flags 307, a watermark indicator 309, a packet type 311, a bypass indicator 313, a board ID/channel field 315, an error field 317, a control field 319, and a packet length field 321. Words 323, 325, and 327 contain the 20 byte IP header 329. Word 327 also contains a TCP/UDP source port field 331, and a TCP/UDP destination port field 333.

The format and meaning of the watermark indicator 309 is given in Table 1 above. The watermark indicator 309 is used in conjunction with an internal service class (ISC) and a drop preference bit (DP) to determine when drop a packet, as shown in Table 2 below.

TABLE 2

Congestion Clip Table.

| ISC | DP | Watermark (WM) |
| --- | --- | --- |
| 7 | 0 | 7, 6, 5, 4, 3, 2, 1 |
| 7 | 1 | 7, 6, 5, 4, 3 |
| 6 | 0 | 7, 6, 5, 4, 3, 2 |
| 6 | 1 | 7, 6, 5, 4 |
| 5 | 0 | 7, 6, 5, 4, 3 |
| 5 | 1 | 7, 6, 5 |
| 4 | 0 | 7, 6, 5, 4 |
| 4 | 1 | 7, 6 |
| 3 | 0 | 7, 6, 5 |
| 3 | 1 | 7 |
| 2 | 0 | 7, 6 |
| 2 | 1 | 7 |
| 1 | 0 | 7, 6 |
| 1 | 1 | 7 |
| 0 | 0 | 7 |
| 0 | 1 | 7 |

The disclosed technology tags an inbound descriptor 125 with the three bit watermark indicator 309 as they are read by the CXP 127. The three watermark bits of the watermark indicator 309 indicate the current congestion level of the buffer memory 119 and free buffer pool 117. As various thresholds are crossed, the drain rate for the input FIFO A memory 121 and FIFO B memory 123 is increased by discarding lower priority data packets.

Quality of Service (QOS) Classification/Policing

In one embodiment of the disclosed technology, classification and policing are accomplished either implicitly from a type of service (TOS) Octet in the IP header 329, or explicitly as determined by filtering in specific packet attributes configured by the user. The result of the classification is a 3 bit (8 level) internal service class (ISC) and a drop preference bit (DP). This 4 bit value is used exclusively within the disclosed technology to make QOS related determinations.

Figure 4B:
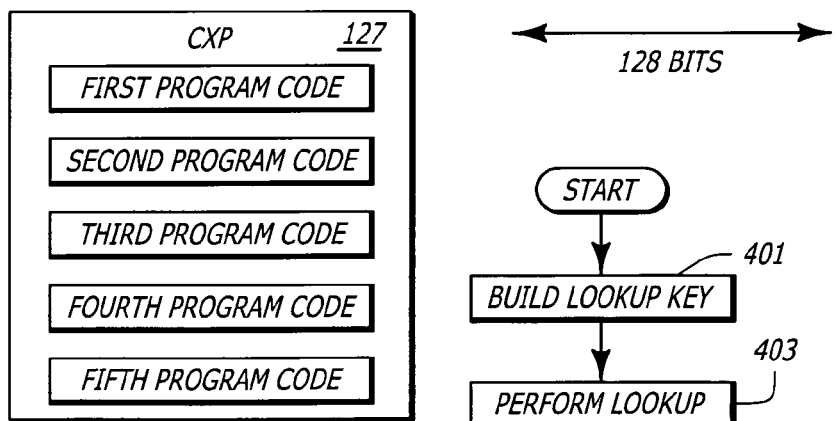
FIG. 4B shows computer program data used in conjunction with the method of FIG. 4A.
Figure 4A:
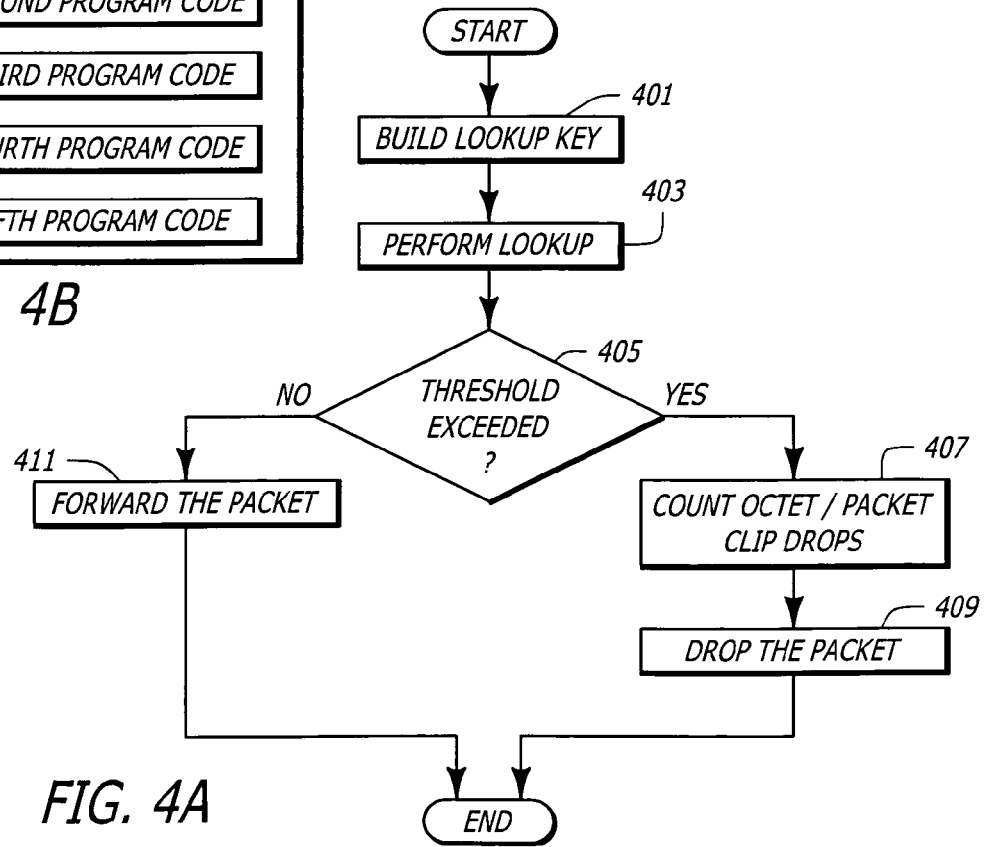
FIG. 4A shows a flow diagram of a method for discarding and forwarding data packets compatible with the present invention.

The policing algorithm shown in FIG. 4A uses user programmable parameters to determine if the traffic rate being received has exceeded the rate of the traffic contract. In certain situations it is desirable to re-classify packets as determined from their traffic utilizations. In these cases the ISC/DP values may be modified during policing operations. At step 401, a lookup key is built using the ISC, DP and watermark values. At 403, a lookup is performed. If at step 405, a threshold is exceeded, at step 407 the number of octet/packet clip drops is counted, and the packet is dropped at step 409. Otherwise, at step 411 the packet is forwarded to the packet destination. The corresponding program data is shown in FIG. 4B.

QOS Congestion Management

In order to differentiate between contracted service levels, there should be traffic management mechanisms in place to ensure that higher precedence traffic has a better chance of making it through the concentrator than best effort traffic, especially in the case of system congestion. This system congestion is indicated by low resources in the free buffer pool 117. It is desirable to ensure 'premium' class traffic over 'best effort'.

In order to make an intelligent choice on which packets to discard and which to keep, at least three parameters are evaluated: 1) the severity of the resource shortage, indicated by watermark bits 309 in the inbound descriptor 125, 2) the ISC of the packet, and 3) the DP indication, a traffic rate exceeding its committed information rate (CIR) may be subject for quick discard. The CXP 127 performs this evaluation by concatenating the ISC, DP, and WM values into a key for a lookup into a configurable congestion clip table, an example of which is shown above in Table 2. The lookup will either 'hit', indicating the packet continues to be forwarded, or 'miss' in which case the packet is discarded or 'clipped'.

Figure 5:
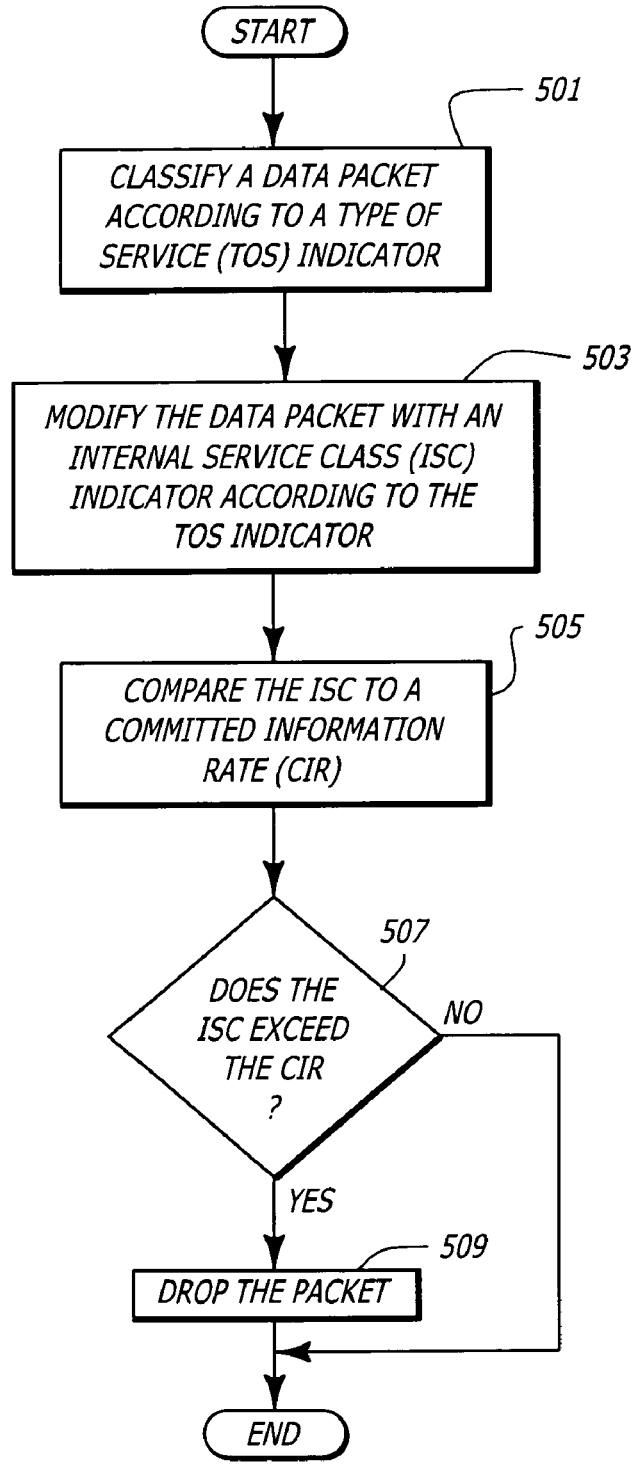
FIG. 5 shows a flow diagram of a method for discarding data packets compatible with the present invention.

FIG. 5 shows an example flow diagram of a method for discarding data packets. At step 501, a data packet is classified according to a TOS indicator. At step 503, the data packet is modified with an ISC indicator according to the TOS indicator. Such classification is accomplished by analyzing a field of the data packet to determine a packet characteristic, and assigning the TOS indicator based upon the packet characteristic. At step 505, the ISC is compared to a CIR. If at step 507 the ISC exceeds the CIR, the data packet is dropped at step 509.

It is desirable that in these congested scenarios that the lesser precedence packets can be dropped at a rate fast enough to allow for higher precedence packets to continue to be forwarded and also to drain the inbound descriptor queues (FIFO A memory 121 and FIFO B memory 123) in order to replenish the free buffer pool 117.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for discarding a data packet comprising:
   classifying the data packet including a type of service (TOS) indicator in order to produce an internal class service (ISC) indicator and a drop preference (DP) indicator;
   modifying the data packet with a watermark (WM) indicator according to an availability of a system resource;
   concatenating the ISC indicator, the WM indicator and the DP indicator of the data packet to produce a key value;
   comparing recovered data using the key value to a committed information rate (CIR); and
   discarding the data packet based on a result of a comparison of the recovered data and the CIR.

2. The method of claim 1 wherein the comparing of the recovered data to the CIR comprises:
   finding an entry in a congestion clip table (CCT) using the key value being a concatenation of the ISC indicator, the WM indicator and the DP indicator; and
   comparing data recovered from the entry to the CIR.

3. The method of claim 1 wherein the classifying of the data packet comprises:
   analyzing a field of the data packet to determine a packet characteristic; and
   assigning the TOS indicator based upon the packet characteristic.

4. A computer usable medium having computer readable program code embodied in the medium executed by a route switch processor, the program code comprising:
   a first program code for causing a computer to classify a data packet including a type of service (TOS) indicator in order to produce an internal class service (ISC) indicator and a drop preference (DP) indicator;
   a second program code embodied in the computer usable medium for causing the computer to modify the data packet with a watermark (WM) indicator;
   a third program code embodied in the computer usable medium for causing the computer to concatenate the ISC indicator, the WM indicator and the DP indicator of the data packet to produce a key value;
   a fourth program code embodied in the computer usable medium for causing the computer to compare data recovered using the key value to a committed information rate (CIR); and
   a fifth program code embodied in the computer usable medium for causing a computer to discard the data packet based on a result of the comparison of the data recovered and the CIR.

5. The computer usable medium of claim 4 wherein the fourth program code embodied in the computer usable medium is further configured to:
   finding an entry in a congestion clip table (CCT) using the key value.

6. The computer usable medium of claim 4, wherein the first program code comprises:
   computer readable program code to analyze a field of the data packet to determine a packet characteristic; and
   computer readable program code to assign the TOS indicator based upon the packet characteristic.

* * * * *